Feb. 10, 1931.    T. W. ROLPH    1,791,936
REFLECTING LUMINAIR
Filed April 22, 1926    2 Sheets-Sheet 1
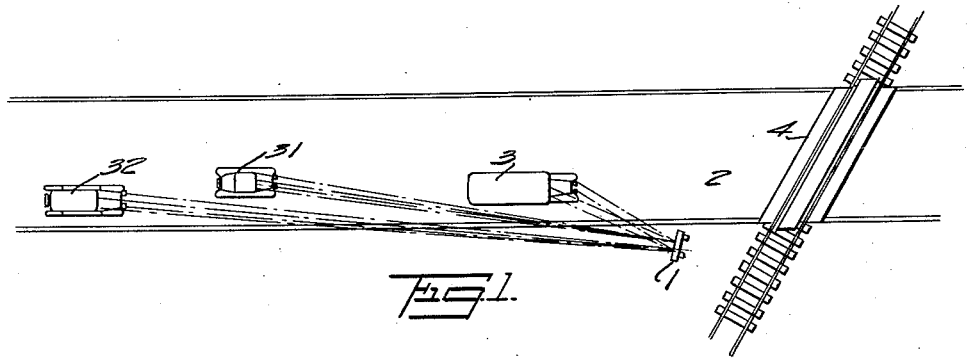
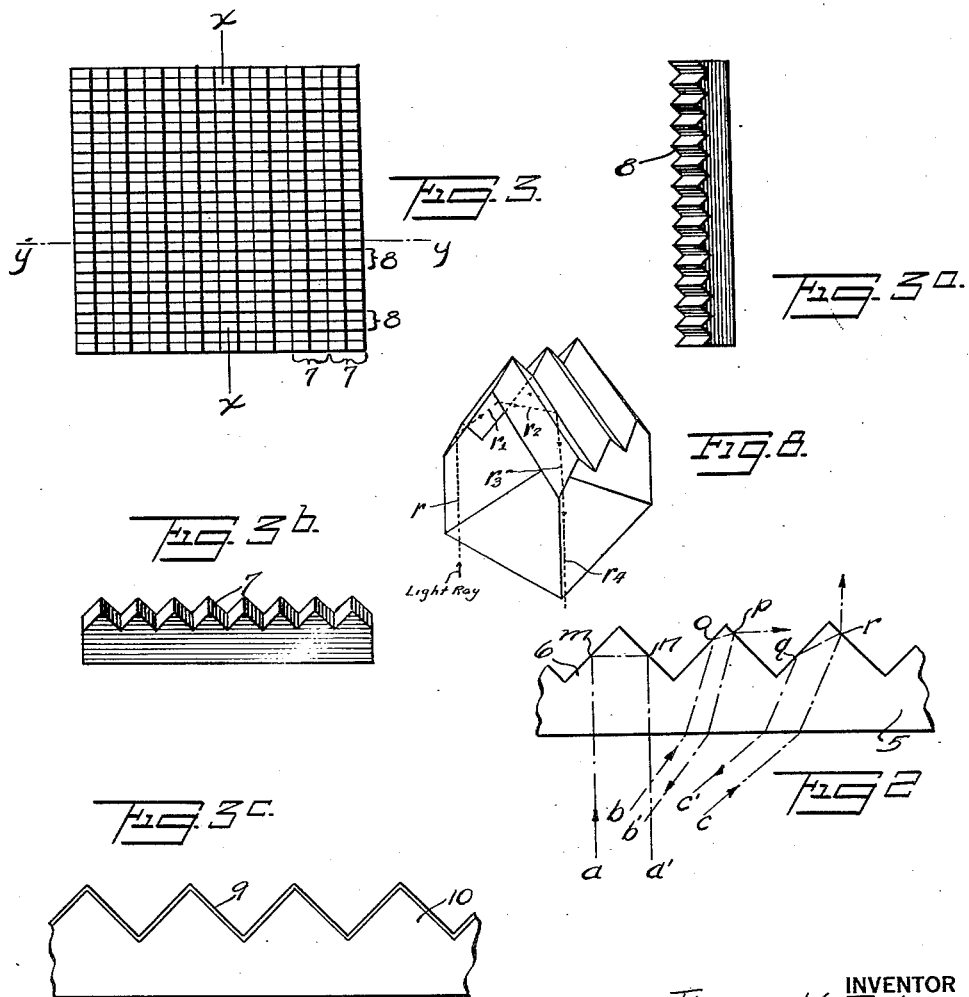
INVENTOR
Thomas W. Rolph
BY
his ATTORNEY

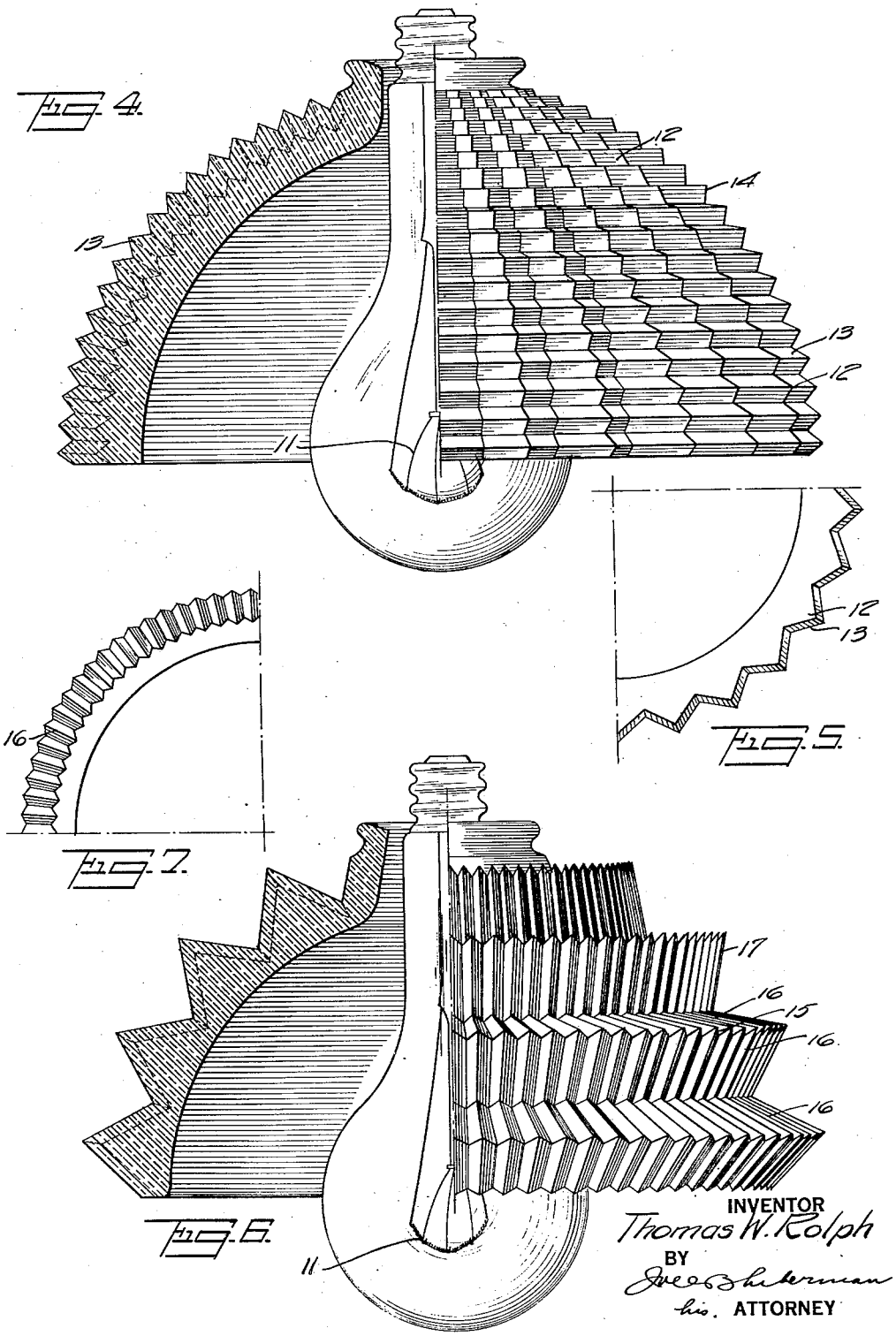

Patented Feb. 10, 1931

1,791,936

UNITED STATES PATENT OFFICE

THOMAS W. ROLPH, OF NEWARK, OHIO, ASSIGNOR TO HOLOPHANE COMPANY, INC., OF NEW YORK, N. Y., A CORPORATION OF NEW YORK

REFLECTING LUMINAIR

Application filed April 22, 1926. Serial No. 103,761.

The object of this invention is the construction of a prismatic arrangement which will serve to increase the amount of reflected light from a luminair. It is especially applicable to reflecting plates for use in crossing signs, but it is also applicable to reflectors of other types in which it is desired to increase the reflecting efficiency of the prismatic construction. In reflecting plates for road work as an automobile warning it replaces the ordinary road sign or the mirror. At night the light from the automobile headlights is reflected back to the driver and thus the sign appears as a lighted sign.

Fig. 1 is a diagrammatic representation of the road, automobile cross sign and crossing.

Fig. 2 is a cross section of the ordinary double reflecting prism as used on reflectors showing the course of light rays from incident light.

Fig. 3 is a plan view of a plate having prisms constructed according to the present invention.

Fig. 3a is a cross section on line x—x of the plate shown in Fig. 3;

Fig. 3b is a cross section on line y—y of Fig. 3;

Fig. 3c is a cross section of a fragment of a plate embodying a modification of the invention;

Fig. 4 is an elevation of a reflector having a prismatic construction as described herein, one-quarter being cut away to show the prismatic construction in cross section;

Fig. 5 is a quadrant of a bottom view of the reflector shown in Fig. 4;

Fig. 6 is an elevation of another form of a reflector employing a modification of the prismatic construction shown herein, cut away to show a cross section of the prisms;

Fig. 7 is a quadrant of a bottom view of the reflector shown in Fig. 6; and

Figure 8 is a fragment of one of the large prisms cut away to show diagrammatically typical action of light rays.

In Fig. 1, showing the diagrammatic view of the ordinary crossing problem, 1 is the warning signal or plate, as it is usually placed with reference to the roadway 2 and railroad tracks 4. The signal 1 must reflect the light rays incident from the headlight of the approaching automobiles 3, 31 and 32 directly back upon themselves, no matter what direction they may come from. In order to get this maximum effect plain mirrors have been tried, but these will not operate in the desired manner. A plate 5 made up of vertical prisms 6 will, however, reflect light directly back upon itself in the manner shown by the prisms in Fig. 2. In Fig. 2 light rays $a$, $b$ and $c$ are all reflected back directly in the path from which they came, in directions $a'$, $b'$ and $c'$ regardless of their original direction of incidence. I have observed, however, that such a prismatic arrangement is very inefficient for the present purpose and is not practical therefore because as soon as the angle of incidence deviates appreciably from the normal the loss of light transmitted through the prisms becomes very great. For example, in Fig. 2 total reflection occurs at $m$ and $n$ and light ray $a$ is efficiently reflected back upon its course. For light rays $b$ and $c$, however, total reflection occurs at the points $o$ and $q$ but does not occur at points $p$ and $r$. Most of the light in the entering light ray is transmitted through the plate at points $p$ and $r$. In order to overcome this objection, I run horizontal reflecting prisms smaller than the vertical prisms across the reflecting surfaces of the vertical prisms. This will then insure practically total reflection at points $p$ and $r$. The finished plate appears as shown in Fig. 3. In general there will be a series of large vertical prisms 7 and running directly across all the operating faces of the vertical prisms a series of horizontal prisms 8. Or as shown in Fig. 3c, I may place a mirror backing 9 across the top of the prisms 10.

When such a plate is set up in a vertical position and light projected upon it from any angle in the same horizontal plane as the sign as shown in Fig. 1, a large proportion of the light will be reflected directly back upon its course. There will be some loss due to light reflected from one face of the large prism missing the other face but these losses will not be serious except at extremely wide lateral angles where the highest efficiency is of small importance. If the light projected on the plate or sign is not in substantially the same horizontal plane as the sign there would be a much lower efficiency or reflection but such conditions are not ordinarily the case. The sign is usually on eye level or substantially so and the light comes from about the same horizontal level. Some variation from the horizontal plane can be tolerated without serious losses in reflection.

Fig. 8 shows a fragment of one of the large prisms 7 in a fragment long enough to carry three of the small prisms 8 on each of its faces. A typical light ray $r$ enters the glass through the smooth surface opposite the prism surface and is reflected in direction $r'$ $r^2$ $r^3$ and emerges in direction $r^4$. It is reflected twice on one side of the large prism and twice on the other face of the large prism, and emerges from the glass in the direction from which it came. The two reflections on each face of the large prisms are produced by the small prism which forms a typical reflecting secondary prism on each face of the large prism.

This prismatic construction can also be applied to reflectors of other types as shown in Figs. 4, 5, 6 and 7, and thus improve the reflecting efficiency of such reflectors. In order to obtain the maximum improvement, reflectors spherical in contour are designed with the light source 11 in the center of the sphere as shown in Figs. 4 and 6. The application of this type of prismatic construction to reflectors need not, however, be confined to those of spherical contour.

Fig. 4 shows a reflector 14 and light source 11 in which large radial or vertical reflecting prisms 12 run up and down the reflector and horizontal prisms 13 are placed on the face of each large prism and run around the reflector. This presents a typical application of the construction applied to the conventional type of reflector. Fig. 6 shows a different application, the reflector 17 having large horizontal reflecting prisms 15 which run around the reflector and small radial prisms 16 which are superimposed on the faces of the larger radial prisms.

Fig. 5 shows a quadrant of a bottom plan view of the reflector shown in Fig. 4 in order to bring out the construction of the prisms, and Fig. 7 shows a similar bottom plan view of Fig. 6.

The prismatic construction described herein has many uses. It can be used in the prismatic plates shown in Fig. 1, as a stop boulevard sign, parking signal or as a lettered sign giving street names, house numbers, etc., or in large sheets as a daylight and artificial lighting combination in buildings or the like.

In the claims we have used the expression "an extraneous source" which is intended to distinguish from such sources as are placed inside of an enclosure and has special reference to sources outside of the prismatic construction in the sense of the headlights of an approaching automobile, the light from an extraneous street lamp and the like.

I claim:

1. A primary reflecting prism having a plurality of secondary reflecting prisms superimposed across the faces of the primary prism adapted to increase the proportion of reflected light.

2. A primary reflecting prism constructed to reflect light back in the direction of incidence and a plurality of secondary reflecting prisms superimposed across the faces of the primary prisms and adapted to increase the amount of light so reflected.

3. A reflector comprising a series of primary reflecting prisms having a plurality of secondary reflecting prisms superimposed across the faces of the primary prisms adapted to increase the proportion of light acted upon by double reflection.

4. A prismatic construction comprising primary reflecting prisms adapted to receive certain incident light from an extraneous source and a plurality of prisms superimposed across the faces of such primary prisms to increase the proportion of light reflected from the source.

Signed at New York city, in the county of New York and State of New York, this 19th day of April, 1926.

THOMAS W. ROLPH.